United States Patent
Linsel

(10) Patent No.: US 10,814,919 B2
(45) Date of Patent: Oct. 27, 2020

(54) STRUCTURALLY REINFORCED HOLLOW ELEMENT AND A VEHICLE BODY COMPRISING SAID STRUCTURALLY REINFORCED HOLLOW ELEMENT

(71) Applicant: FORD GLOBAL TECHNOLOGIES, LLC, Dearborn, MI (US)

(72) Inventor: Jens Linsel, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 16/288,504

(22) Filed: Feb. 28, 2019

(65) Prior Publication Data
US 2019/0263454 A1  Aug. 29, 2019

(30) Foreign Application Priority Data

Feb. 28, 2018 (DE) .................. 10 2018 202 968

(51) Int. Cl.
*B62D 27/06* (2006.01)
*B62D 29/00* (2006.01)
*B62D 27/02* (2006.01)

(52) U.S. Cl.
CPC .......... *B62D 27/065* (2013.01); *B62D 27/02* (2013.01); *B62D 29/00* (2013.01)

(58) Field of Classification Search
CPC ....... B62D 27/065; B62D 27/02; B62D 29/00
See application file for complete search history.

(56) References Cited

U.S. PATENT DOCUMENTS

| | | | |
|---|---|---|---|
| 6,237,304 B1 * | 5/2001 | Wycech | B62D 29/002 52/847 |
| 7,153,054 B2 | 12/2006 | Arbona | |
| 9,051,958 B2 | 6/2015 | Grojean et al. | |

(Continued)

FOREIGN PATENT DOCUMENTS

| | | |
|---|---|---|
| DE | 602005001799 T2 | 4/2008 |
| DE | 202013103548 U1 | 8/2013 |

(Continued)

OTHER PUBLICATIONS

English Machine Translation of DE102015110436B3 dated Oct. 27, 2016.

(Continued)

*Primary Examiner* — Lori L Lyjak
(74) *Attorney, Agent, or Firm* — David Coppiellie; King & Schickli, PLLC

(57) ABSTRACT

A structurally reinforced hollow element includes a wall which surrounds a cavity at least in part. The wall extends three-dimensionally in such a manner that it comprises (a) a first wall portion with an opening and a second wall portion which is situated diametrically opposite the first wall portion and is spaced apart from the first wall portion, and (b) a bolt. The bolt includes at its first axial bolt end a bolt head that protrudes in the radial direction beyond a head-side bolt extent. The bolt also includes a second axial bolt end, which is remote from the first axial bolt end, is fastened on the second wall portion in a manner that is resistant to axial displacement. An overall clearance remains between an outside surface of the first wall portion and a radial surface of the bolt head which faces the outside surface.

17 Claims, 4 Drawing Sheets

(56) References Cited

U.S. PATENT DOCUMENTS

Figure 1:
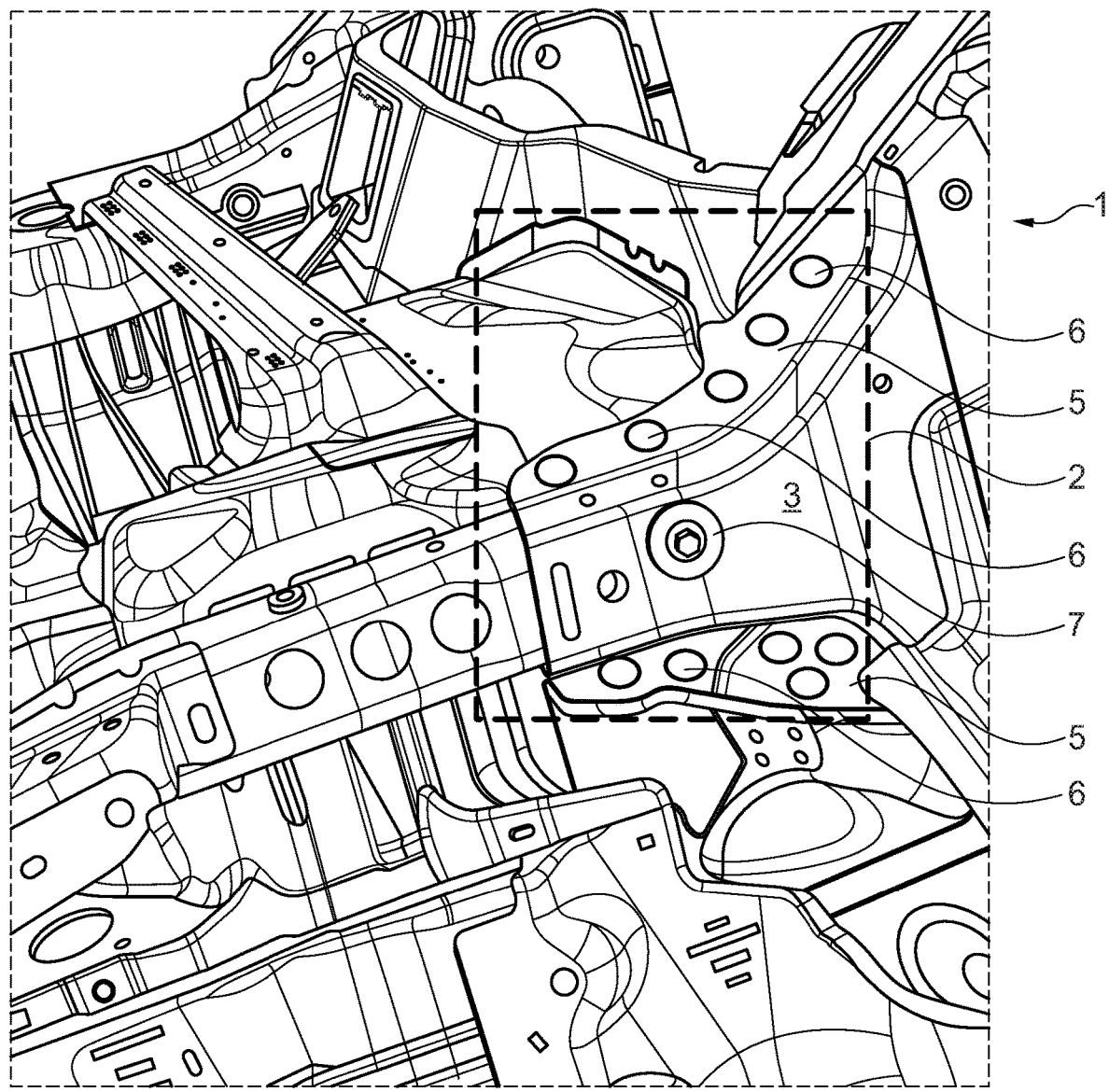

| | | |
|---|---|---|
| 9,610,904 B2 | 4/2017 | Huelke |
| 2010/0202856 A1 | 8/2010 | Donovan |
| 2015/0061272 A1* | 3/2015 | Watanabe .............. B62D 21/11 |
| | | 280/784 |
| 2015/0217721 A1* | 8/2015 | Lakic .................... B62D 25/04 |
| | | 280/801.1 |
| 2016/0123057 A1 | 5/2016 | Mildner et al. |
| 2019/0217898 A1* | 7/2019 | Tchepikov ........... B62D 29/007 |

FOREIGN PATENT DOCUMENTS

| | | |
|---|---|---|
| DE | 202014008599 U1 | 3/2016 |
| DE | 102015110436 B3 | 10/2016 |
| FR | 2848355 B1 | 2/2005 |

OTHER PUBLICATIONS

English Machine Translation of DE202013103548U1 dated Aug. 28, 2013.
English Machine Translation of DE202014008599U1 dated Mar. 10, 2016.
English Machine Translation of DE602005001799T2 dated Apr. 20, 2008.
English Machine Translation of FR2848355B1 dated Feb. 4, 2005.
"Special Recessed Hex Flange Head Shoulder Bolt with Round Washer"; Alibaba.com; https://www.alibaba.com/product-detail/Special-Recessed-Hex-Flange-Head-Shoulder_60159522158.html; printed Sep. 22, 2017, pp. 1-11.

* cited by examiner

STRUCTURALLY REINFORCED HOLLOW ELEMENT AND A VEHICLE BODY COMPRISING SAID STRUCTURALLY REINFORCED HOLLOW ELEMENT

TECHNICAL FIELD

This document relates to a structurally reinforced hollow element, in particular for a vehicle body. This document also relates to a vehicle body having such a structurally reinforced hollow element.

BACKGROUND

In a preferred manner, vehicle panels, in particular vehicle panels which form a vehicle body, are designed in a thin manner in vehicle construction, among other things for saving weight and for reducing fuel consumption. Said procedure, however, conflicts with the stringent requirements for the safety of the vehicle passengers which is influenced to a certain extent by the stability of the vehicle body. Consequently, parts of the vehicle body that are normally heavily loaded are reinforced as a result of additional measures.

Structural reinforcement of a doorframe of a vehicle door consisting of various sheet metal parts is shown, for example, in US 2016/0123057 A1 (also DE 20 2014 008 599 U1). The structural reinforcement is provided in a hinge region of the doorframe. In this connection, a hollow element, which comprises a wall and surrounds a cavity, is reinforced by a sleeve, which penetrates the cavity. More particularly, the sleeve is inserted in the hollow element between two diametrically opposite wall portions of the wall, the two wall portions being supported against said sleeve. As a result, a higher load-bearing force receiving region is created in the doorframe for the connection between the vehicle door and the doorframe.

U.S. Pat. No. 9,051,958 B2 discloses a blind rivet threaded bolt which comprises a blind rivet insert with an internal thread, by way of which an external thread of the threaded bolt can be moved to engage in the blind rivet insert as a result of tightening. By screwing the threaded bolt into the blind rivet insert, it is compressed under plastic deformation. A flat element, which is arranged between a bolt head of the threaded bolt and the material bulging radially outward when the blind rivet insert deforms plastically is clamped in this manner such that it can be fastened securely, for example, to a wall.

FR 2 848 355 B1 shows a freely rotatable roller for an alternator which is fastened (the roller) on a motor by means of a threaded bolt. In this connection, a hub of the roller is mounted on a cylindrical bolt head between two bolt collars which are spaced apart from one another and protrude beyond the bolt extent in the radial direction such that the roller is secured against large axial displacement.

A screw connection for fastening a fuel distributor bar to a cylinder head of an internal combustion engine in a liquid-tight manner is described in US 2010/0202856 A1.

U.S. Pat. No. 7,153,054 B2 (also DE 60 2005 001 799 T2) discloses a further screw connection for attaching a non-metal component to a metal component.

U.S. Pat. No. 9,610,904 B2 (also DE 20 2013 103 548 U1) shows a push-pin with an overtravel stop.

Among the numerous commercially available threaded bolts, such are also known, among others, which comprise a bolt collar, which protrudes radially outward beyond the bolt extent, between a bolt head, which is attached on a first axial bolt end and protrudes radially outward beyond the bolt extent, and a screw thread portion which is arranged on a second axial bolt end and is spaced apart from the first axial bolt end. Such threaded bolts are obtainable, for example, from Taishin Hardware Limited, China, under the product designation TX-S935.

In particular in vehicle construction, to achieve lighter vehicle weights and at the same time implement stringent safety requirements, structural cavity components or cavity elements are frequently used, for example, for the vehicle body. They are preferably realized from metal sheets with a single shell or multiple shells, for example two shells, with one or multiple walls, for example double walls, and the like. As a rule, such cavity components completely surround a cavity, in particular on all sides. However, they can also simply comprise a closed cross section, for example being realized in a tubular manner with a substantially round, oval or angular cross section and open at the side. Said cavity elements first and foremost offer the advantage of building in a light and at the same time sturdy manner.

Structural cavity elements frequently comprise weld seams, for example in order to connect two shell elements together in a substance-to-substance bond. It has been shown that with the high heat input locally into the sheet material forming the cavity components during welding, local material weakening occurs in the region of the weld seam. The cavity components thus lose strength, for example in the region around the weld points of a spot weld, which can result in the cavity components being prematurely torn apart in the case of extreme load. Such high loads can occur, for example, in the event of a vehicle crash, as a result of which the cavity component is to a large extent plastically deformed. The premature tearing apart of the cavity components leads to the loss of the effective cross section formed by the intact cavity component such that the cavity component only adsorbs a relatively small amount of energy.

In addition to the previously used term of cavity component or cavity element, a more broadly interpreted term of hollow element is used herein below. Such a hollow element is to include the previously described designs of a cavity body and, in addition, also designs having a wall which comprises a non-closed cross section, such as, for example, a hollow element with a U-shaped, open cross section.

SUMMARY

Against said background, it is an object to provide an improved, in particular structurally reinforced, hollow element, for example for a vehicle body, as well as an improved vehicle body having a hollow element. Both comprise a high degree of strength in spite of a low weight such that they provide a high degree of stability even under a particularly heavy load, for example in the event of a vehicle crash, and consequently, for example, as a result of a high degree of energy adsorption protect vehicle passengers from accident damage. In addition, the hollow element and the vehicle body are to be constructed simply and compactly and are to be usable in an equally uncomplicated manner in the mass production of vehicles.

Said object is achieved by a structurally reinforced hollow element and by a vehicle body with the features of the following claims.

It must be pointed out that the features stated individually in the following description are able to be combined together in an arbitrary, technically sensible manner and demonstrate further designs of the structurally reinforced hollow element and the vehicle body. The description characterizes and specifies the structurally reinforced hollow element and the vehicle body additionally in particular in conjunction with the figures.

Accordingly, a structurally reinforced hollow element, in particular for a body of a vehicle, comprises a wall which surrounds a cavity at least in part. The wall extends, in this connection, three-dimensionally in such a manner, that is to say in three-dimensional space, that it comprises a first wall portion with an opening and a second wall portion which is situated diametrically opposite said first wall portion and is spaced apart from said first wall portion. In other words, at least part of the cavity surrounded by the hollow element is situated between the first wall portion and the second wall portion. A wall which extends flatly simply in two dimensions, that is to say in a planar manner, does not fall under this definition in terms used in this document, a U-shaped wall, however, seen, for example, in cross section does, as the two wall portions which form the respective free U-legs are located diametrically opposite one another such that part of the cavity surrounded by said wall is situated between said two wall portions.

The cross section formed by a wall of another hollow element can be realized in general in a polygonal manner, for example in a rectangular, square, trapezoidal, triangular manner and the like. The traverse is able to be closed or open insofar as there are two wall portions which are situated diametrically opposite one another at a spacing such that part of the cavity is arranged between them.

In addition, the structurally reinforced hollow element comprises a bolt, which comprises at its first axial bolt end a bolt head which protrudes in the radial direction beyond the head-side bolt extent and comprises a greater diameter than the opening in the first wall portion, the bolt being pushed through the opening of the first wall portion. The second axial bolt end of the bolt, which is remote from the head-side first bolt end, is fastened on the second wall portion in a manner that is resistant to axial displacement. An overall clearance remains between an outside surface of the first wall portion and a radial surface of the bolt head which faces said outside surface.

In other words, the bolt attached on the second wall portion by way of its second axial end in a manner that is resistant to axial displacement comprises a long axial length in such a manner that the bolt head or the radial surface of the bolt head facing the outside surface of the first wall portion comprises a clear distance to the outside surface of the first wall portion. Such a space between the outside surface of the first wall portion and the radial surface of the bolt head, which is simply filled by the ambient atmosphere of the hollow element, is to be understood herein as the overall clearance or clear distance. Permanent, direct or indirect contact, for example by means of an intermediate plate or spacer, between the radial surface of the bolt head and the outside surface of the first wall portion is not provided in the case of the hollow element.

Insofar as an intermediate plate or spacer should be added between the bolt head and the first wall portion, which is to be possible within the meaning of this invention and is to be included by the definition given above, the size of the distance between the radial surface of the bolt head and the outside surface of the first wall portion in this case is dimensioned in such a manner that said distance is greater than the thickness (in the axial direction of the bolt) of the added intermediate plate such that in all cases an overall clearance or a clear distance remains between the radial surface of the bolt head and the outside surface of the first wall portion even when an intermediate plate is added.

The fastening of the second bolt end to the second wall portion in a manner that is resistant to axial displacement can be effected as a substance-to-substance bond and/or in a non-positive locking manner, for example as a result of welding, bonding, riveting, screwing, clamping for example by means of press fit and the like. Said type of fastening can be effected, for example, on an inside surface of the second wall portion, which can be accomplished without a large amount of expenditure in particular when the hollow element has an open cross section, for example a substantially U-shaped cross section.

The particular advantage of the structurally reinforced hollow element is to be seen, on the one hand, in that the structural reinforcement brought about by means of the bolt has no negative effects whatsoever on the stability of the hollow element for the proper receiving and forwarding of usual force loads, for which the hollow element is designed as such. In particular, the clear distance between the bolt head and the first wall portion ensures that neither during the mounting of the bolt on the hollow element nor during the proper use of the hollow element as a result of normally occurring, if also slight elastic deforming of the wall as a consequence of usual force effects, is an influence weakening the hollow element exerted by the bolt onto said hollow element. For example, the hollow element is not subject to unwanted deforming of the wall of the hollow element on account of (high) tensile force/tensile stress exerted by the bolt between the first and second wall portions during normal operation. The overall clearance between the bolt head and the first wall portion ensures that with the hollow element under usual load conditions, no such force passes from the bolt onto the wall of the hollow element.

However, in the event of a force acting on the hollow element which exceeds its dimensionally stable load limit and introduces irreversible, permanent, plastic deforming of the hollow element, as can occur, for example, in the event of a vehicle crash, the first wall portion, as a result of its deformation, moves into contact with the bolt head of the bolt. The radial surface of the bolt head facing the outside surface of the first wall portion then moves into positive locking abutment against the first wall portion. As the bolt is fastened on the second wall portion in a manner that is resistant to axial displacement, the bolt or the bolt head prevents extensive deformation of the hollow element in the axial direction of the bolt, which in particular prevents the hollow element tearing apart prematurely. The hollow element, structurally reinforced in this manner, can consequently transfer the force acting thereon over a longer period of its plastic deformation to other structures and additionally adsorb a larger energy portion as a result of its own plastic deformation.

The increased strength of the hollow element, particularly in cases of the heaviest loads which result in plastic deformation of the hollow element, is achieved by means of the bolt in an uncomplicated manner suitable for mass production with just a small weight increase. Costly structural modifications to the hollow element itself, for example an increase in its wall thickness, a change in its geometry, additional reinforcement ribs and/or reinforcement flanges, are consequently not necessary. As a result, the structurally reinforced hollow element can also be realized in a structurally compact manner and, compared to conventional structural hollow elements, essentially does not require any greater installation space.

As has been shown above, the structurally reinforced hollow element, for example when it is used on a vehicle structure, lends the vehicle greater stability overall. Thus, the structurally reinforced hollow element offers the vehicle passengers, in particular in the case of a vehicle crash, increased safety as the structurally reinforced hollow element has a high energy absorption capacity.

The teaching disclosed herein offer, over and above this, the further advantage of even already existing, conventional structural hollow elements being able to be transferred into a structurally reinforced hollow element at little structural cost. To this end, just one opening is to be introduced into a first wall portion of the wall forming the hollow element, through which opening a bolt, which is described as above and comprises a bolt head, is pushable, the second axial end of which is fastened in a manner that is resistant to axial displacement on a second wall portion which is situated diametrically opposite the first wall portion. Such structural reinforcement of a conventional hollow element is simple to carry out and does not require any substantially costly design changes to the hollow element itself, in particular, for example, no increase in the wall thickness or a modified geometric design, additional reinforcement ribs and/or reinforcement ribs and the like.

According to an advantageous design of the structurally reinforced hollow element, the second wall portion also comprises an opening, through which the bolt is pushed, that is to say through which essentially the second axial bolt end is pushed. The bolt consequently projects with its second bolt end through the opening of the second wall portion beyond an outside surface of the second wall portion such that the second bolt end is also able to be fastened without any great cost along the outside surface of the second wall portion on said second wall portion in a manner that is resistant to axial displacement, for example using the fastening techniques already mentioned above.

According to a further advantageous design, the overall clearance between the radial surface of the bolt head and the outside surface of the first wall portion has a value greater than 0, within the range of, in a preferred manner, approximately between 0.5 mm and approximately 10 mm, in a more preferred manner approximately between 1 mm and approximately 7 mm and even more preferably approximately between 1.5 mm and approximately 5 mm. In this way, a substantially disadvantage-free interaction between the bolt and the wall of the hollow element can be ensured, on the one hand, for the conventional load of the hollow element, that is to say when just its wall deforms plastically. On the other hand, with emerging plastic deformation the structurally reinforced effect of the bolt on the wall of the hollow element can be developed in a completely targeted manner from a certain degree of deformation. Tolerances can be compensated for expediently with the overall clearance, any prestress being applied to the hollow structure also being prevented at the same time.

A further advantageous design of the structurally reinforced hollow element provides that the bolt comprises, in the region of its second bolt end, a bolt collar which protrudes in said region in the radial direction beyond the bolt extent and abuts against an inside surface of the second wall portion. The axial position necessary for obtaining the structurally reinforced effect of the bolt described herein can thus be precisely fixed in a particularly simple manner, which simplifies mounting the bolt on the wall of the hollow element in a considerable manner as the bolt collar only always has to be moved to abut against the inside surface of the second wall portion in order to fix the desired clear distance between the bolt head and the first wall portion.

In a particularly simple manner, the clear distance between the bolt head and the first wall portion can also be modified by adding one or multiple intermediate plates, washers or spacers between the bolt collar and the inside surface of the second wall portion. Thus, one and the same bolt can also be used, for example, on different hollow elements for structural reinforcement although the first and second wall portions thereof are spaced apart from one another, for example, at various intervals.

It is obvious that the opening in the first wall portion comprises a diameter which, on the one hand, is greater than the diameter of the bolt collar in order to be able to push the bolt together with its bolt collar through said opening, on the other hand, however, comprises a smaller diameter than the bolt head or its radial surface.

According to yet another advantageous design, the bolt comprises, in the region of its second axial bolt end, a screw thread portion by means of which the bolt is fastened on the second wall portion in a manner that is resistant to axial displacement. The screw thread which is complementary to the screw thread of the bolt for screw-connecting the bolt on the second wall portion in a manner that is resistant to axial displacement, can be realized, for example, in one piece with the second wall portion, for example on the inside or outside surface thereof, or can be provided by a separate nut. In the latter case, the second wall advantageously comprises the through opening already mentioned above such that the second axial bolt end is pushed through it and the nut can be screwed from the outside surface of the second wall portion onto the screw thread realized on the second axial bolt end. For safer axial fixing by means of the nut, which is screw-connected onto the second bolt end outside the hollow element, the bolt comprises in a preferred manner the bolt collar, which has also been described above, as abutment, the bolt collar being moved to abut against the inside surface of the second wall portion.

Yet another advantageous design provides that the bolt comprises a threadless bolt portion which adjoins the radial surface of the bolt head facing the outside surface of the first wall portion. Said bolt portion preferably comprises a substantially smooth, for example cylindrical surface. This ensures that the inside edge of the opening of the first wall portion cannot move into unwanted engagement with the bolt. This could be the case, for example, if a threaded portion of the bolt were to extend up to the radial surface of the bolt head and the bolt, with the structurally reinforced hollow element used as intended, were to be excited to produce radial vibrations which could result in contact between the threaded portion and the inside edge of the opening of the first wall portion.

A further advantageous design provides that the wall of the hollow element at the site of the bolt, that is to say in particular along a center axis of the bolt, comprises a closed cross section, simply with the exception of the opening in the first wall portion and where applicable the opening in the second wall portion if present. In other words, the cross section of the hollow element according to said design can be described by a closed traverse (simply with the exception of the one or both openings). Subsequently, at a radial distance from the center axis of the bolt, which exceeds at least the radius of the opening of the first wall portion, the outline of the wall cross section is completely closed by the structurally reinforced hollow element according to said design and can be described by a closed traverse. The traverse can also comprise curved portions along with substantially straight portions.

As has already been mentioned elsewhere herein, the cross section of the wall of the structurally reinforced hollow element can also be open, for example can be realized in a U-shaped manner. In addition, the wall can be realized in a manner known per se with one shell or multiple shells, for example with two shells.

According to yet another advantageous design, the wall of the structurally reinforced hollow element is formed from a metal material. Steel and aluminum materials are particularly preferred as metal materials. For example, the wall can be formed from one or multiple metal sheets of steel, high-tensile steel (HSS) or ultra-high-tensile steel (UHSS), in order to obtain a high degree of strength for the wall of the hollow element initially per se. Other materials such as, for example, plastic materials and/or fiber-reinforced plastics are naturally also conceivable, glass-fibers, carbon fibers and/or aramid fibers being usable as reinforcement fibers. Non-detachable or detachable joints can be provided as joints, weld connections, bonding connections, rivet connections or screw connections being suitable options.

According to yet another advantageous design, the wall comprises at least one weld seam. For example, the end portions of a single-shell design of the entire wall of the hollow element can be connected together in a substance-to-substance bond on a longitudinal side along a connecting and/or reinforcement flange by means of a weld, for example spot weld, such that the wall of the hollow element comprises a closed cross section. In a similar manner, walls composed of multiple shells (in particular two shells) can also be connected together by a weld, for example spot weld, at corresponding flanges for connection and/or connecting together. As has already been explained herein, local material weakness can occur in the region of the weld seam or of the weld points as a result of the welding and of the resultant high heat input locally into the wall material. The structurally reinforced effect of the bolt is capable of at least compensating for said material weakening such that the hollow element, which is structurally reinforced in this manner, comprises a sufficiently high degree of strength in spite of the welding. The wall or wall portions of the hollow element tearing apart prematurely in the case of particularly high force input, as can occur, for example, in the case of a vehicle crash, is effectively prevented. More particularly, the hollow element, on account of a substantially intact, effective cross section, is able to counter a higher resistance to the plastic deformation over a longer period of said plastic deformation. In a particularly preferred manner, the bolt is or multiple such bolts are arranged in the region of such weld seams of the hollow element.

According to a further aspect, a vehicle body is provided for a vehicle which comprises at least one hollow element for a light and nevertheless structurally solid design of the vehicle body. The hollow element is realized as a structurally reinforced hollow element according to one of the designs described above.

BRIEF DESCRIPTION OF THE DRAWING FIGURES

Figure 2:
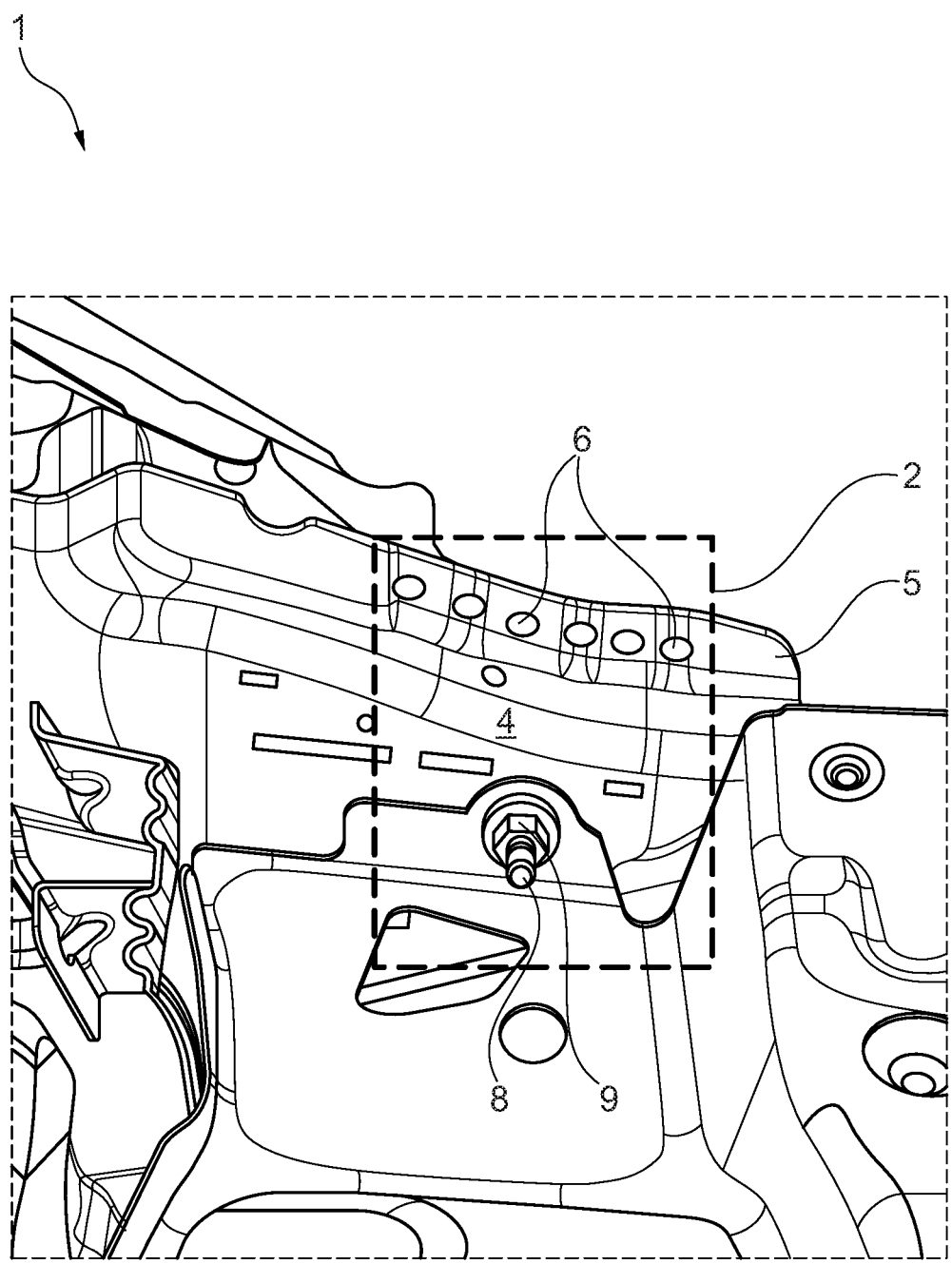
Figure 3:
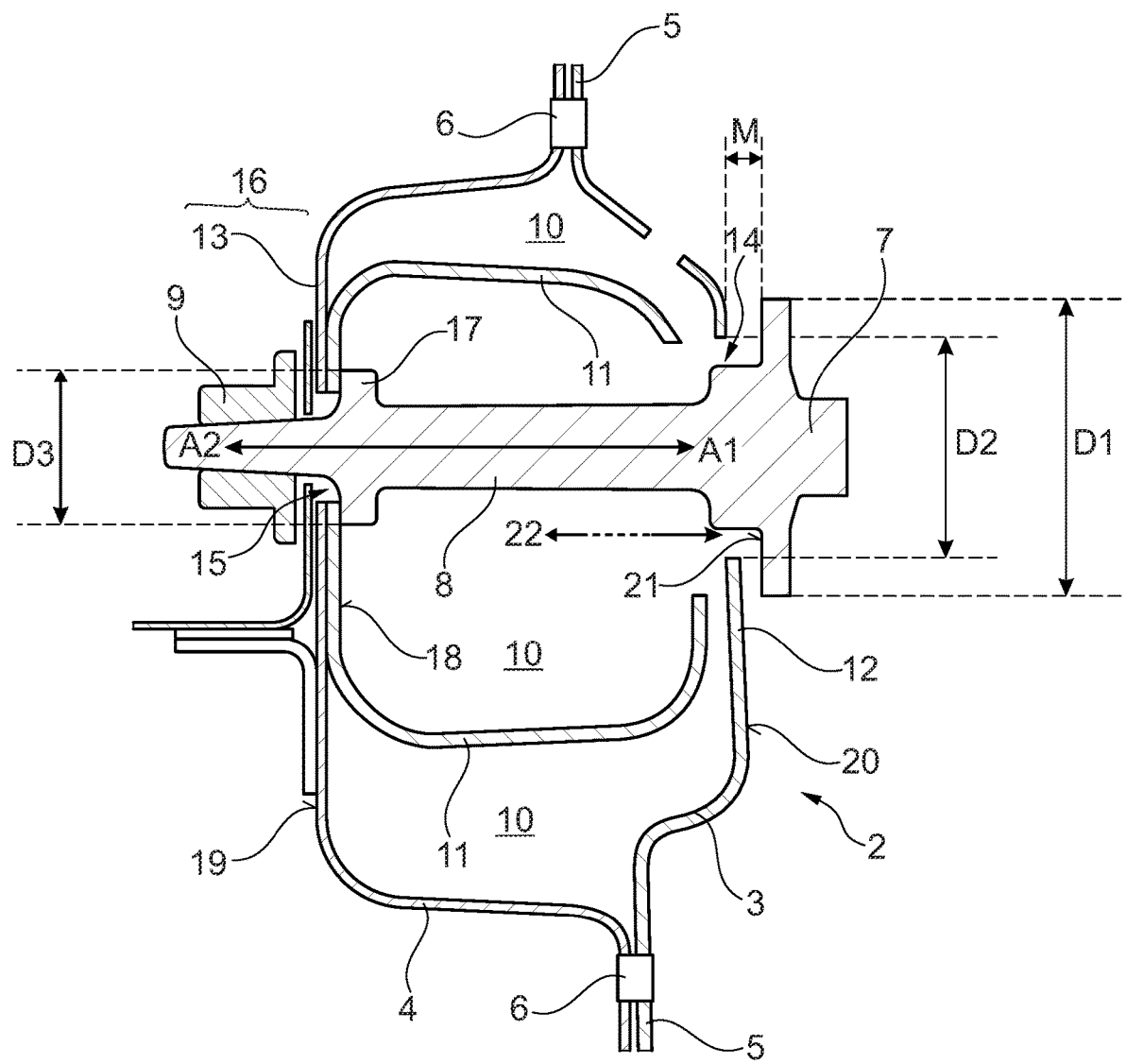
Figure 4:
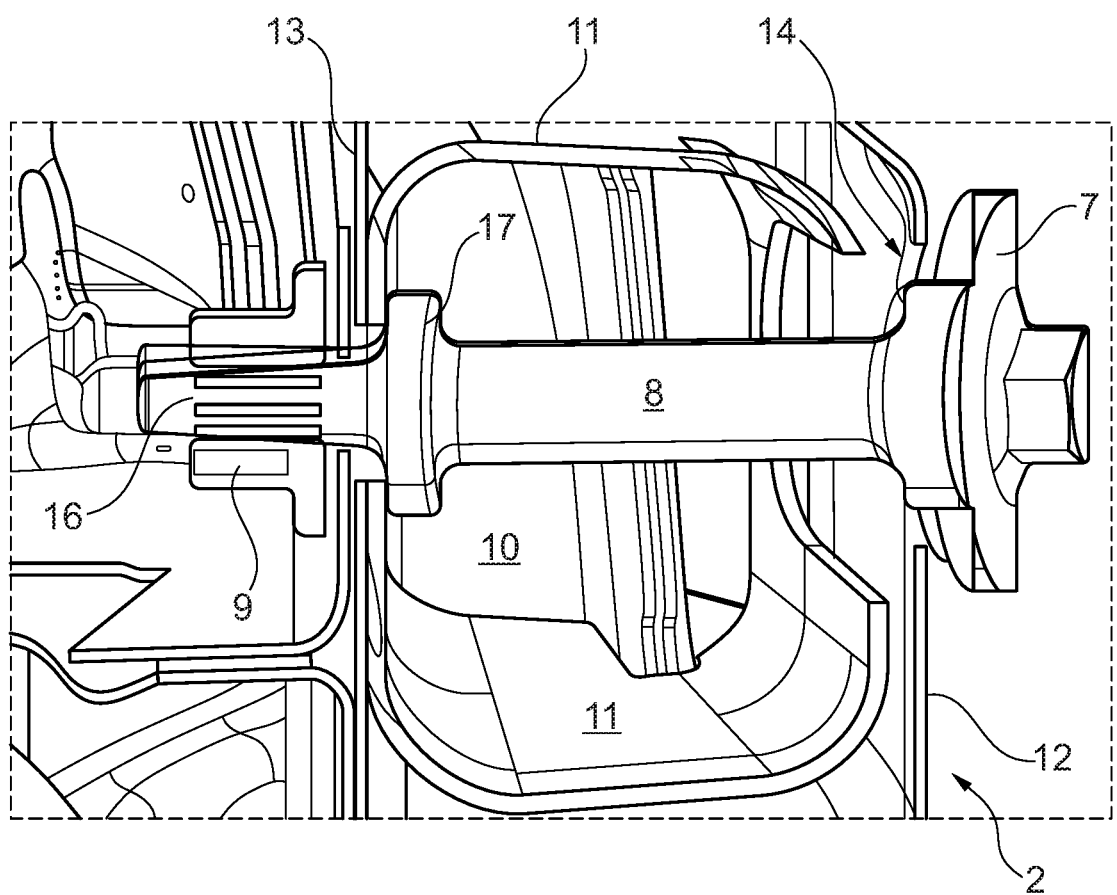

Further features and advantages of the structurally reinforced hollow element and vehicle body are produced from the following description of exemplary embodiments which are not to be understood as restricting and are explained in more detail below with reference to the drawing, in which in a schematic manner:

FIG. 1 shows a perspective view of an outside surface of part of an exemplary embodiment of a vehicle body of a vehicle which comprises a structurally reinforced hollow element according to an exemplary embodiment, FIG. 2 shows a perspective view of an inside surface of part of the vehicle body from FIG. 1 with the structurally reinforced hollow element shown in FIG. 1, FIG. 3 shows a cross sectional view of the structurally reinforced hollow element from FIG. 1, and FIG. 4 shows a further cross sectional view of the structurally reinforced hollow element from FIG. 1.

DETAILED DESCRIPTION

Equivalent parts as regards their function are always provided with the same reference symbols in the various figures such that, as a rule, they are also only described once.

FIG. 1 shows a schematic representation of a perspective view of an outside surface of part of an exemplary embodiment of a vehicle body 1 of a vehicle which is not shown in any detail and comprises at least one structurally reinforced hollow element 2. The region of the hollow element 2 looked at here is characterized in FIG. 1 by a frame shown with a broken line.

The exemplary embodiment of the hollow element 2 shown in FIGS. 1-4 is a double-shell hollow element 2 which here comprises a wall formed from two individual wall shells 3 and 4, for example an upper shell 3 and a lower shell 4. The wall shells 3, 4 of the hollow element 2 is formed in the case of the exemplary embodiment shown from a metal material, in particular a high-strength steel material such as, for example, HSS or UHSS.

As can also be seen in FIG. 1 and FIG. 3, the two wall shells 3 and 4 are connected in a substance-to-substance bond along two connecting flanges 5 which extend substantially in the longitudinal direction of the hollow element 2 and also provide an effect structurally reinforcing the hollow element 2 in order to form the wall shells 3, 4 of the hollow element 2. For connecting the two wall shells 3 and 4 in a substance-to-substance bond, they are connected together along the connecting flange 5 by means of spot welding. Individual weld points 6 are indicated in FIG. 1 surrounded by circles or ellipses.

FIG. 1 additionally shows a bolt head 7 of a bolt 8 which is not shown in any further detail in FIG. 1 (see FIG. 2).

FIG. 2 shows a perspective view of an inside surface of part of the vehicle body 1 from FIG. 1 with the structurally reinforced hollow element 2 shown in FIG. 1. FIG. 2 shows an axial end of the bolt 8 and a nut 9 screwed onto said axial end of the bolt 8.

FIGS. 3 and 4 each show a cross-sectional view of the structurally reinforced hollow element 2 from FIG. 1. FIG. 3 clearly shows how the wall of the hollow element 2 formed from the two wall shells 3 and 4 surrounds a cavity 10. FIG. 3 additionally shows that a further wall 11 is arranged in the cavity 10 inside the wall shells 3, 4 of the hollow element 2 such that the hollow element 2 can also be designated as double-walled hollow element 2. The second wall 11 arranged inside the wall shells 3 and 4 is, however, not absolutely necessary. It can be provided for additional increase in the strength of the hollow element 2. The effect, however, is already obtained as a result of the interaction between the wall shells 3, 4 and the bolt 8 such that the wall 11 will not be discussed any further below.

FIG. 3 shows that the wall shells 3, 4 extends three-dimensionally in space in such a manner that it comprises a first wall portion 12 and a second wall portion 13 which is situated diametrically opposite said first wall portion and is spaced apart from said first wall portion. In the case of the embodiment of the hollow element 2 shown here, the first wall portion 12 is a portion of the first wall shell 3 and the second wall portion 13 is a portion of the second wall shell 4.

In addition, FIG. 3 shows an opening 14 in the first wall portion 12 and a further opening 15 in the second wall portion 13. The bolt 8 is pushed through the two openings 14 and 15. Apart from the openings 14 and 15, the wall shells 3 and 4 comprises a substantially closed cross section at the site of the bolt 8, in the representation in FIG. 3 more or less along the center axis of the bolt 8.

It can also be seen from FIG. 3 that the bolt head 7 is arranged on the first axial bolt end A1 of the bolt 8. The bolt head 7 protrudes in the radial direction beyond the head-side bolt extent and comprises a clearly greater diameter D1 than the diameter D2 of the opening 14 in the first wall portion 12.

The bolt 8 comprises a screw thread portion 16 on its second axial bolt end A2, which is remote from the first bolt end A1. The nut 9 is screwed onto said screw thread portion 16. In addition, the bolt 8 comprises, in the region of its second bolt end A2, a bolt collar 17 which protrudes in said region in the radial direction beyond the bolt extent and, as can be seen well in FIG. 3, abuts against an inside surface 18 of the second wall portion 13.

As additionally shown clearly in FIG. 3, the bolt collar 17 is arranged on the bolt 8 between the screw thread portion 16 and the bolt head 7. In order to be able to push the bolt 8 together with its collar 17 through the opening 14 in the first wall portion 12, the dimensions of the diameter D2 are greater than those of the diameter D3 of the bolt collar 17.

The bolt 8 is fastened on the second wall portion 13 in a manner that is resistant to axial displacement as a result of the nut 9 being screwed onto the threaded portion 16 of the bolt 8 against an outside surface 19 of the second wall portion 13 and the bolt collar 17 abutting against the inside surface 18.

As additionally shown clearly in FIG. 3, an overall clearance M remains between an outside surface 20 of the first wall portion 12 and a radial surface 21 of the bolt head 7 which faces said outside surface once the bolt 8 has been mounted as shown on the second wall portion 13 in a manner that is resistant to axial displacement. Said overall clearance M is greater than 0 and in a particularly preferred manner is within a range of between approximately 1 mm and approximately 5 mm.

In addition, the bolt 8 in the exemplary embodiment of the hollow element 2 shown in FIG. 3 comprises a threadless, cylindrical or cone-shaped bolt portion 22 which adjoins the radial surface 21 of the bolt head 7 facing the outside surface 20 of the first wall portion 12. Said bolt portion can extend up to the bolt collar 17. The bolt portion 22 is not forcibly restricted to a cylindrical or cone-shaped cross section but can comprise any suitable cross section insofar as the chosen cross section is able to transfer the corresponding forces.

The structurally reinforced hollow element and the vehicle body described above are not restricted to the embodiments disclosed herein but also include further equivalently operating embodiments which are produced from further technically meaningful combinations of the features described herein of both the hollow element and of the vehicle body.

In a preferred realization, the structurally reinforced hollow element is used in a vehicle body, for example of a single-track or multi-track vehicle. The vehicle body, comprising at least one structurally reinforced hollow element, is used in a preferred manner in a vehicle, for example a single-track or multi-track vehicle.

What is claimed:

1. A structurally reinforced hollow element for a vehicle body, comprising:
   a wall at least partially surrounding a cavity, wherein the wall extends three-dimensionally and includes a first wall portion with a first opening and a second wall portion which is situated diametrically opposite said first wall portion and is spaced from said first wall portion; and
   a bolt having (a) a bolt head, at a first axial bolt end, that protrudes in a radial direction beyond a head-side bolt extent, said bolt head having a greater diameter than the first opening in the first wall portion in which said bolt is received and (b) a second axial bolt end remote from the first axial bolt end, said second axial bolt end being fastened on the second wall portion in a manner that is resistant to axial displacement and wherein an overall clearance remains between an outside surface of the first wall portion and a radial surface of the bolt head which faces said outside surface.

2. The structurally reinforced hollow element as claimed in claim 1, wherein the second wall portion includes a second opening through which the bolt is received.

3. The structurally reinforced hollow element as claimed in claim 2, wherein the overall clearance comprises a value within a range of between 0.5 mm and 10 mm.

4. The structurally reinforced hollow element as claimed in claim 3, wherein the bolt includes in a region of the second axial bolt end, a bolt collar that protrudes in said region in a radial direction beyond a bolt extent and abuts against an inside surface of the second wall portion.

5. The structurally reinforced hollow element as claimed in claim 4, wherein the bolt includes, in the region of the second axial bolt end, a screw thread portion by which the bolt is fastened on the second wall portion.

6. The structurally reinforced hollow element as claimed in claim 5, wherein the bolt includes a threadless bolt portion which adjoins the radial surface of the bolt head facing the outside surface of the first wall portion.

7. The structurally reinforced hollow element as claimed in claim 6, wherein the wall includes a closed cross section at a site of the bolt.

8. The structurally reinforced hollow element as claimed in claim 7, wherein the wall is formed from a metal material.

9. The structurally reinforced hollow element as claimed in claim 8, wherein the wall includes at least one weld seam.

10. The structurally reinforced hollow element of claim 1, wherein the overall clearance comprises a value within a range of between 0.5 mm and 10 mm.

11. The structurally reinforced hollow element of claim 1, wherein the bolt includes in a region of the second axial bolt end, a bolt collar that protrudes in said region in a radial direction beyond a bolt extent and abuts against an inside surface of the second wall portion.

12. The structurally reinforced hollow element of claim 1, wherein the bolt includes, in the region of the second axial bolt end, a screw thread portion by which the bolt is fastened on the second wall portion.

13. The structurally reinforced hollow element of claim 1, wherein the bolt includes a threadless bolt portion which adjoins the radial surface of the bolt head facing the outside surface of the first wall portion.

14. The structurally reinforced hollow element of claim 1, wherein the wall includes a closed cross section at a site of the bolt.

15. The structurally reinforced hollow element of claim 1, wherein the wall is formed from a metal material.

16. The structurally reinforced hollow element of claim 1, wherein the wall includes at least one weld seam.

17. The vehicle body having at least one hollow element as set forth in claim 1.

* * * * *